Dec. 28, 1943.

H. F. MAYER ET AL 2,337,911

ELECTRIC REGULATOR

Filed Sept. 20, 1940

Inventors:
Harry F. Mayer,
Anatole M. Gurewitsch,
by Harry E. Durham
Their Attorney.

Patented Dec. 28, 1943

2,337,911

UNITED STATES PATENT OFFICE 2,337,911

ELECTRIC REGULATOR

Harry F. Mayer and Anatole M. Gurewitsch, Schenectady, N. Y., assignors to General Electric Company, a corporation of New York Application September 20, 1940, Serial No. 357,592

8 Claims. (Cl. 171—312)

Our invention relates to electric regulating circuits and more particularly to electric circuits including electric discharge devices for controlling an electrical condition of an associated load circuit.

Electric discharge devices have been found to afford decided advantages in the control of an electrical condition, such as the voltage, of an associated load circuit. The electric discharge devices are susceptible of precisely and rapidly controlling the voltage of a load circuit and there has been evidenced a decided need for new and improved apparatus of this nature.

It is an object of our invention to provide a new and improved electric regulating circuit.

It is another object of our invention to provide a new and improved electric regulating circuit including electric discharge apparatus for controlling an electrical condition, such as the voltage, of an associated load circuit.

It is a further object of our invention to provide a new and improved electric valve regulator whereby the initial cost of the electric regulator may be substantially reduced without sacrificing the precision and rapidity of control available by the use of electric valve apparatus.

Briefly stated, in the illustrated embodiments of our invention we provide new and improved regulating systems for controlling the voltage of a load circuit. The regulating systems comprise electric discharge devices which control or regulate the magnitude of the voltage impressed across the load circuit. The voltage controlling function is accomplished primarily by means of the electric regulator which comprises an electric discharge device, and additional energy supplying means are provided to transmit current to the load circuit independently of the electric regulator. In one modification of our invention, the electric regulator comprises an electric discharge device connected in series relation between the source and the load circuit and additional means is provided to supply current to the load circuit in parallel with the electric discharge device. In another modification of our invention, we provide a main source of current and an auxiliary source of current which are inter-connected through the electric regulator, the regulating function being accomplished primarily by means of the regulator circuit.

Figure 1:
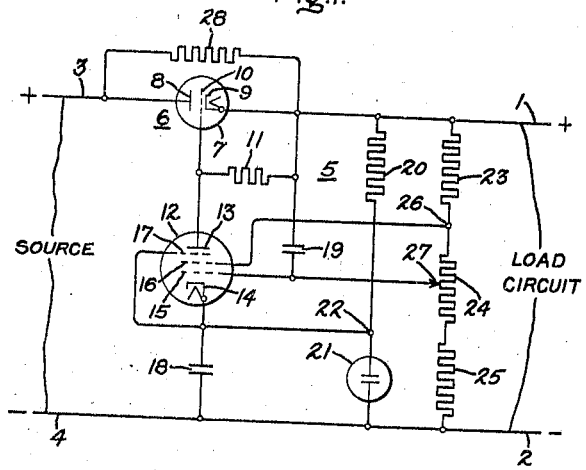
Figure 2:
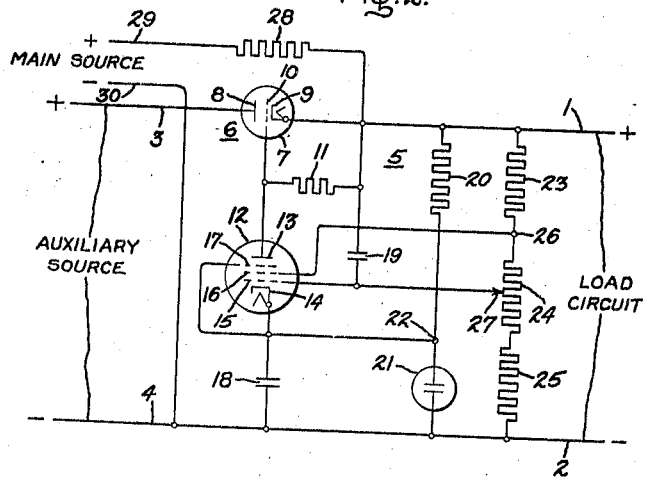

For a better understanding of our invention, reference may be had to the following description taken in connection with the accompanying drawing and its scope will be pointed out in the appended claims. Fig. 1 diagrammatically illustrates our invention as applied to an improved system for energizing a direct current load circuit from a source of direct current, and Fig. 2 represents another modification of our invention in which a main source and an auxiliary source of current are employed for jointly energizing a direct current load circuit.

Referring now more particularly to Fig. 1, our invention is there illustrated as applied to a system for energizing a load circuit, such as a direct current load circuit comprising conductors 1 and 2, from a source of current, such as a direct current source comprising conductors 3 and 4. We provide an electric regulator 5 connected to the source and having an output circuit connected to conductors 1 and 2. The electric regulator 5 comprises a variable impedance means, such as an electric discharge device 6, preferably of the high vacuum type, having an evacuated envelope 7, an anode 8, a cathode 9 and a control means, such as a control member or grid 10.

As a means for varying the effective impedance of the electric discharge device 6 in response to a predetermined controlling influence, such as an electrical condition of either the source or the load circuit, we provide an impedance element 11 preferably connected between the cathode 9 and the control grid 10, and an electric discharge device 12 which transmits variable amounts of current through the impedance element 11, thereby controlling the potential of the control grid 10. The electric discharge device 12 is also preferably of the high vacuum type comprising an anode 13, a cathode 14, a control grid 15, a screen grid 16 and a suppressor grid 17 which may be connected to the cathode 14. The cathode 14 may be connected to the negative conductor 4 through a capacitance 18. A capacitance 19 may be connected between one terminal of the impedance element 11 and the control grid 15 in order to absorb extraneous transient voltage variations, thereby filtering the undesirable variations in control voltage.

As a means for controlling the conductivities of electric discharge devices 6 and 12, we provide a voltage divider comprising a serially connected resistance 20 and a constant voltage device such as a glow discharge valve 21. Of course, this voltage divider may be connected across the source if it is desired to operate the system in response to an electrical condition of the source. Common juncture 22 of resistance 20 and discharge valve 21 is preferably connected to cathode 14 of discharge device 12, thereby maintaining the potential of the cathode at a substantially constant value, independently of the variations in the voltage of the load circuit. As a means for impressing on control grid 15 and screen grid 16 potentials the magnitudes of which vary in response to the controlling influence, such as the voltage of the load circuit, we provide a voltage divider including resistances 23, 24 and 25 which are preferably connected in series relation across the load circuit. The screen grid 16 may be connected to common juncture 26 of resistances 23 and 24, and control grid 15 may be connected to a suitable point along the voltage divider, such as to an adjustable contact 27 associated with resistance 24. Adjustable contact 27 serves as a means for adjusting the output voltage which the system maintains across the load circuit.

We provide means for supplying current to the load circuit independently of the electric regulator including electric discharge device 6, thereby relieving the regulator of the necessity of transmitting the entire current demanded by the load circuit. This additional current supplying means may comprise an impedance element, such as a resistance 28, connected across the anode and cathode of the electric discharge device 6. The larger portion or percentage of the load current is transmitted through resistance 28. The distribution of load current between the regulator and the resistance 28 may be adjusted for a particular load demand by manipulation of adjustable contact 27.

The operation of the embodiment of our invention shown in Fig. 1 will be explained by considering the system when it is operating to supply power to the load circuit at substantially constant voltage. The system is initially adjusted by means of the control apparatus including adjustable contact 27, so that a predetermined voltage is maintained across the load circuit. Of course, by this adjustment there is effected a predetermined distribution of the load current between electric discharge device 6 and resistance 28. The system may be initially adjusted to obtain the desired load distribution at the desired load voltage.

The voltage impressed across the load circuit is determined by the current conducted by electric discharge device 6. Of course, the current conducted by the electric discharge device 6 is determined by the potential of its control grid 10. If the load voltage tends to rise above the preestablished value, the potentials of control grid 15 and screen grid 16 of electric discharge device 12 will rise with respect to the potential of cathode 14, causing discharge device 12 to conduct an increased amount of current and thereby lowering the potential of control grid 10 of electric discharge device 6. The lowering of the potential of control grid 10 increases the effective impedance of discharge device 6, consequently decreasing the load voltage to the predetermined desired value. In like manner, the system will respond to raise the potential of control grid 10 if the voltage of the load circuit decreases to a value below the preestablished value so that the load voltage is returned to the desired value.

The use of the glow discharge valve 21 in the manner shown maintains the potential of the cathode 14 substantially constant irrespective of voltage variations of the load circuit. Furthermore, the use of discharge valve 21, in the manner shown, impresses between the control grid 15 and screen grid 16 and the cathode 14 substantially the entire incremental voltage variation of the load circuit determined by resistances 23—25, thereby increasing the sensitivity of the regulator.

The system may be adjusted so that the greater portion of the load current is transmitted through resistance 28 which, of course, has a certain regulation or voltage variation with variation in load, thereby permitting the voltage regulating or controlling function to be accomplished primarily and exclusively by the electric regulator 5. The advantage of apparatus built in accordance with our invention is that the initial cost of the regulating system may be substantially reduced due to the smaller required rating of the regulator for a given load, thereby affording decided features in apparatus economy. Of course, there is an optimum size of regulator to be employed, relative to the ohmic value of the resistance 28, in order to obtain a relatively high efficiency.

Fig. 2 of the accompanying drawing diagrammatically illustrates another modification of our invention involving several of the elements shown in Fig. 1 and corresponding elements have been assigned like reference numerals. In the modification of our invention shown in Fig. 2, we provide a main source of current including conductors 29 and 30, and an auxiliary source including conductors 3 and 4. The main source may be connected to the output circuit of the regulator, the positive conductor 29 may be connected to the positive conductor 1 through resistance 28, and the negative conductor may be connected to the negative conductor 2 or 4, which electrically are at the same potential. The greater portion or percentage of the load current is supplied by the main source, and the electric regulator is required to transmit only a fraction of the load current in accomplishing the load voltage regulating function. In this manner, the main source and the auxiliary source operate in parallel to supply the load circuit, and the regulating function is accomplished primarily by the electric discharge device 6 and the associated apparatus. The main source, of course, has a certain amount of voltage regulation due to the presence of the impedance element 28. Of course, if the main source inherently has a regulation sufficient for paralleling purposes, the resistance 28 need not be employed.

The embodiment of our invention shown in Fig. 2 operates in substantially the same way as that explained above in connection with Fig. 1. The main source and the auxiliary source operate in parallel relationship to energize the load circuit, and the electric regulator 5 operates to maintain the load voltage substantially constant. The potential of the control grid 10 of electric discharge device 6 is raised and lowered in response to voltage variations of the load circuit to maintain the load voltage constant. This control, as explained above, is accomplished by means of the electric discharge device 12 and the associated grid control apparatus. The system may be initially adjusted by the control means, including movable contact 27, so that the main source supplies the greater amount of the load current.

The system shown in Fig. 2 may be adjusted so that the auxiliary source supplies only a fraction, such as, for example, only 25% of the total current demanded by the load circuit. Load current fluctuations ranging from fifteen to twenty per cent will be completely absorbed by the regulator 5; that is, the regulator serves to maintain the load voltage constant for substantial variations in load. In like manner, variations in the magnitude of the voltages of the main source and the auxiliary source will also be compensated for and corrected by the regulator 5.

If the regulator is used primarily to maintain constant output voltage in spite of input voltage variations, it should be noted that some series impedance, a calculable amount, is necessary in the main source. However, if the regulator is only required to maintain constant output voltage for output current or power variations, the input voltage remaining relatively constant, the smaller the impedance in the main source the smaller is the regulatory action required of the regulator. The optimum amount of impedance, and the necessary size of the auxiliary supply and the regulator, may be easily determined in any specific case given the maximum range of input voltage variations and the maximum range of output current variations.

One of the important advantages of the system shown in Fig. 2 is that the entire load current need not flow through the anode-cathode circuit of the electric discharge device 6 which is connected in series relation with the auxiliary source and the load circuit. Consequently, the electric regulator including the electric discharge device 6 may be of smaller rating and consequently will be less expensive. Of course, there is an optimum rating for the regulator. The saving in the initial cost of the regulator must not be offset completely by the cost of the auxiliary supply or source. A further advantage afforded by this arrangement is that a smaller power loss is incurred in the resistance 28 connected in circuit with the main source than would be incurred if all the current were passed through the regulator.

Consequently, it will be observed that there is appreciable saving in power and in power supply cost.

While we have shown and described our invention as applied to particular systems of connections and as embodying various devices diagrammatically shown, it will be obvious to those skilled in the art that changes and modifications may be made without departing from our invention, and we, therefore, aim in the appended claims to cover all such changes and modifications as fall within the true spirit and scope of our invention.

What we claim as new and desire to secure by Letters Patent of the United States is:

1. In combination, a load circuit, a main source of current, an auxiliary source of current, a regulator connected between said auxiliary source and said load circuit comprising an electric discharge device and having an output circuit connected to said load circuit, means for connecting said output circuit and said main source to said load circuit so that said main source and said auxiliary source operate in parallel to energize jointly said load circuit, means for varying the conductivity of said electric discharge device in response to a predetermined electrical condition of said load circuit.

2. In combination, a load circuit, a main source of current, an auxiliary source of current, a regulator connected to said auxiliary source and having an output circuit, means for connecting said main source and said output circuit to said load circuit, said regulator comprising an electric discharge device having a control member, and means for variably energizing said control member in response to a predetermined controlling influence derived from said load circuit.

3. In combination, a load circuit, a main source of current, an auxiliary source of current, a regulator connected to said auxiliary source and having an output circuit connected to said load circuit, means for connecting said main source to said output circuit so that said auxiliary source and said main source operate in parallel to energize said load circuit conjointly, and means for adjusting the output voltage of said regulator to effect a predetermined division of load between said main source and said auxiliary source.

4. In combination, a main source of direct current, an auxiliary source of direct current, a load circuit, an electric regulator connected to said auxiliary source and having an output circuit connected to said load circuit, said regulator comprising an electric discharge device for controlling the voltage impressed across said load circuit, means for connecting said main source to said load circuit so that said main source and said auxiliary source operate in parallel to energize said load circuit, and means for controlling the conductivity of said electric discharge device to maintain the voltage of said load circuit substantially constant.

5. In combination, a main source of direct current, an auxiliary source of direct current, a load circuit, an electric regulator connected to said auxiliary source and having an output circuit connected to said load circuit, said regulator comprising an electric discharge device having a control member, means for connecting said main source to said output circuit so that said main source and said auxiliary source operate in parallel to energize said load circuit and comprising an impedance element connected in series relation with said output circuit and said main source, and means for variably energizing said control member in response to the voltage of said load circuit.

6. In combination, a main source of direct current, an auxiliary source of direct current, a regulator connected to said auxiliary source comprising an electric discharge device and having an output circuit connected to said load circuit, means comprising a resistance connected between said main source and said output circuit so that the voltage regulation of said load circuit is effected primarily by said regulator, means for controlling the conductivity of said electric discharge device in response to the voltage of said load circuit, and means for adjusting the conductivity of said electric discharge device to effect a predetermined load distribution between said main source and said auxiliary source.

7. In combination, a main source of current, an auxiliary source of current, a load circuit, an electric regulator connected to said auxiliary source and having an output circuit connected to said load circuit and comprising an electric discharge device including control means, means for connecting said main source to said output circuit and comprising a resistance connected in series relation with said main source so that the regulation of an electrical condition of said load circuit is determined primarily by said regulator, means for energizing said control means in response to said predetermined electrical condition, and means for adjusting said last mentioned means in order to effect a predetermined load distribution between said main source and said auxiliary source.

8. In combination, a supply circuit having positive and negative terminals, a load circuit having positive and negative terminals, electric translating apparatus connected between said supply circuit and said load circuit and comprising an electric discharge device having an anode, a cathode and a control member, the anode of said discharge device being connected to the positive terminal of said supply circuit and the cathode of said discharge device being connected to the positive terminal of said load circuit, unregulated means connected to said cathode for supplying current to said load circuit independently of said electric discharge device, and means directly connected with one of said circuits for controlling the conductivity of said electric discharge device in response to an electrical condition of one of the circuits to maintain said condition substantially constant.

HARRY F. MAYER.
ANATOLE M. GUREWITSCH.